(12) United States Patent
Marchini et al.

(10) Patent No.: US 12,377,625 B2
(45) Date of Patent: Aug. 5, 2025

(54) APPARATUS FOR BUILDING A CARCASS STRUCTURE OF A TYRE FOR VEHICLE WHEELS

(71) Applicant: Pirelli Tyre S.p.A., Milan (IT)

(72) Inventors: Maurizio Marchini, Milan (IT); Gianni Mancini, Milan (IT); Gaetano Lo Presti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 17/656,122

(22) Filed: Mar. 23, 2022

(65) Prior Publication Data

US 2022/0212428 A1     Jul. 7, 2022

Related U.S. Application Data

(62) Division of application No. 16/405,076, filed on May 7, 2019, now Pat. No. 11,312,095, which is a division
(Continued)

(51) Int. Cl.
*B29D 30/24*     (2006.01)
*B29D 30/32*     (2006.01)

(52) U.S. Cl.
CPC ......... *B29D 30/244* (2013.01); *B29D 30/245* (2013.01); *B29D 30/32* (2013.01);
(Continued)

(58) Field of Classification Search
CPC ...... B29D 30/18; B29D 30/32; B29D 30/248; B29D 2030/3207; B29D 2030/3214;
(Continued)

(56) References Cited

U.S. PATENT DOCUMENTS 1,524,861 A     2/1925    Grove
2,313,035 A     3/1943    Breth
(Continued)

FOREIGN PATENT DOCUMENTS

CN     2463166       12/2001
CN     1659017 A     8/2005
(Continued)

OTHER PUBLICATIONS

Machine translation of JP 60-015136-A, patent document published Jan. 25, 1985.*

(Continued)

*Primary Examiner* — Katelyn W Smith
*Assistant Examiner* — Alexander D Booth
(74) *Attorney, Agent, or Firm* — Finnegan, Henderson, Farabow, Garrett & Dunner, L.L.P.

(57) ABSTRACT

A process for manufacturing tyres for vehicle wheels, comprising the step of building on a forming support a carcass structure comprising at least one carcass ply and, at at least one end edge of the carcass ply, at least one annular anchoring structure comprising at least one substantially circumferential annular insert and at least one filling insert associated to said at least one substantially circumferential annular insert. The step of building the carcass structure comprises the steps of positioning the annular anchoring structure on the carcass ply by moving the annular substantially circumferential insert into contact with an end edge of the carcass ply by means of a special positioning member, pulling down the filling insert on the end edge of the carcass ply and turning up a free end portion of the end edge of the carcass ply so as to form a turned up end portion of the carcass ply including said annular anchoring structure. The pulling down of the filling insert on the end edge of the carcass ply is carried out by a special pulling down member (Continued)

while the substantially circumferential annular insert is retained into a contact position with the end edge of the carcass ply by said positioning member.

12 Claims, 3 Drawing Sheets

Related U.S. Application Data of application No. 15/187,023, filed on Jun. 20, 2016, now Pat. No. 10,322,553, which is a division of application No. 12/743,135, filed as application No. PCT/IB2007/003500 on Nov. 15, 2007, now Pat. No. 9,409,360.

(52) U.S. Cl.
CPC ............... *B29D 2030/3207* (2013.01); *B29D 2030/3214* (2013.01); *B29D 2030/3221* (2013.01); *B29D 2030/3278* (2013.01)

(58) Field of Classification Search
CPC .... B29D 2030/3221; B29D 2030/3264; B29D 2030/3278; B29D 2030/3242; B29D 2030/3285; B60C 15/06; B60C 15/0603; B60C 2015/061
See application file for complete search history.

(56) References Cited

U.S. PATENT DOCUMENTS

| | | | | |
|---|---|---|---|---|
| 2,455,038 | A | | 11/1948 | Breth |
| 2,567,064 | A | | 9/1951 | Frazier |
| 3,032,093 | A | | 5/1962 | Nebout |
| 3,396,066 | A | | 8/1968 | Nädler |
| 3,475,254 | A | * | 10/1969 | Henley .................. B29D 30/58 156/416 |
| 3,638,705 | A | | 2/1972 | Devienne et al. |
| 3,713,950 | A | * | 1/1973 | Beal ........................ B29D 30/32 156/401 |
| 4,148,680 | A | | 4/1979 | Harding |
| 4,264,387 | A | * | 4/1981 | Allitt ..................... B29D 30/32 156/131 |
| 4,324,604 | A | * | 4/1982 | Alexander ............. B29D 30/32 156/401 |
| 4,508,586 | A | | 4/1985 | Brown et al. |
| 4,705,589 | A | | 11/1987 | Enders |
| 4,836,880 | A | * | 6/1989 | Haas ................... B29D 30/247 156/401 |
| 5,300,180 | A | | 4/1994 | Griebling |
| 6,253,816 | B1 | | 7/2001 | Ide |
| 2005/0150587 | A1 | | 7/2005 | Wiens |
| 2005/0161141 | A1 | | 7/2005 | Nakagawa |
| 2005/0211366 | A1 | | 9/2005 | Ogawa |
| 2006/0102272 | A1 | | 5/2006 | Iyanagi et al. |
| 2010/0276068 | A1 | | 11/2010 | Marchini |

FOREIGN PATENT DOCUMENTS

| | | | |
|---|---|---|---|
| DE | 1919184 | | 10/1969 |
| DE | 199 42 220 | A1 | 3/2001 |
| GB | 454142 | | 9/1936 |
| GB | 947182 | | 1/1964 |
| JP | 46-021301 | B | 6/1971 |
| JP | 50-077471 | | 11/1973 |
| JP | 49-103967 | * | 10/1974 |
| JP | 49-103967 | A | 10/1974 |
| JP | S52-032662 | B2 | 8/1977 |
| JP | 58-215337 | | 12/1983 |
| JP | 60-015136 | A * | 1/1985 |
| JP | 62-3935 | | 1/1987 |
| JP | 10-086607 | A | 4/1998 |
| JP | H10-086607 | A | 4/1998 |
| JP | 2006-044035 | | 8/2004 |
| JP | 2005-246823 | A | 9/2005 |
| JP | 2006-76046 | | 3/2006 |
| JP | 2003-025461 | A | 1/2009 |
| KR | 2005-83818 | | 8/2005 |
| RU | 2 247 028 | C2 | 2/2005 |
| SU | 1326446 | | 7/1987 |
| WO | WO 01 08874 | A1 | 2/2001 |

OTHER PUBLICATIONS

Tsujimoto, JPS6015136. Machine Translation by ESpaceNet. (Year: 1985).*
Shirai. JP49-103967. 1974. PTO Hand-Translation. (Year: 2013).*
Decision on Grant Patent for Invention dated Oct. 25, 2011 issued by the Russian Patent Office in corresponding Application No. RU 2010123937/05(034152).
English language translation of DE 1919184 (original document dated Oct. 1969).
English-language translation of Notice of Reasons for Rejection issued by the Japan Patent Office issued Mar. 2, 2012 in corresponding Application No. JP 2010-533672.
European Search Report issued by the European Patent Office on Aug. 7, 2008, for corresponding International Application No. PCT/IB2007/003500.
Machine generated English language translation of CN 2463166 (original document dated Dec. 2001).
Machine-generated English language translation of JP 2006-044035 (original document dated Feb. 2006).
Notice of Reasons for Rejection issued by the Japan Patent Office issued Mar. 2, 2012 in corresponding Application No. JP 2010-533672.
Notification of First Office Action issued by the State Intellectual Property Office of the People's Republic of China on Jul. 5, 2012 in corresponding Application No. CN 200780101901.8 (13 pages).
Office Action issued by the Japan Patent Office on Aug. 28, 2013 in corresponding Application No. JP 2012-124417 (2 pages).
Office Action issued by the Korean Intellectual Property on Nov. 20, 2013 in corresponding Application No. KR 10-2010-7011721 (5 pages).
Translation of JP 49-103967 (original document dated 1974).
Translation of JP 50-077471 (original document dated 1973).
Translation of SU 1326446 (original document dated Jul. 1987).

* cited by examiner

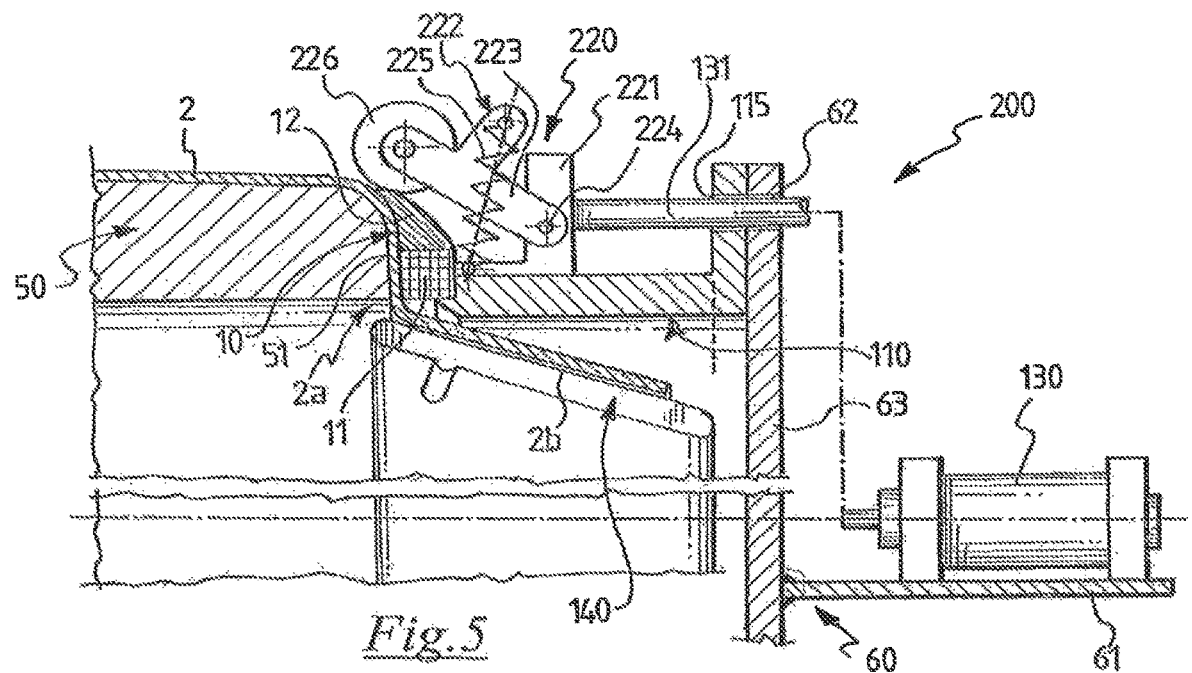

APPARATUS FOR BUILDING A CARCASS STRUCTURE OF A TYRE FOR VEHICLE WHEELS

CROSS REFERENCE TO RELATED APPLICATIONS

This is a divisional of application Ser. No. 16/405,076, filed on May 7, 2019, which is a divisional of application Ser. No. 15/187,023, filed Jun. 20, 2016, which issued as U.S. Pat. No. 10,322,553 on Jun. 18, 2019, which is a divisional of application Ser. No. 12/743,135, filed May 14, 2010, which issued as U.S. Pat. No. 9,409,360 on Aug. 9, 2016, which is a national phase application based on PCT/IB2007/003500, filed Nov. 15, 2007, the content of each application being incorporated herein by reference.

BACKGROUND

Field of the Invention

The present invention relates to a process for manufacturing tyres for vehicle wheels.

The invention further relates to an apparatus for building a carcass structure of a tyre for vehicle wheels, said apparatus being usable in carrying out the above process.

Description of the Related Art

A tyre for a vehicle wheel generally comprises a carcass structure comprising at least one carcass ply comprised of reinforcing cords embedded in an elastomeric matrix. The carcass ply has end edges respectively engaged with annular anchoring structures. The latter are arranged in the zones of the tyre usually identified with the name of "beads" and normally consist each of an annular substantially circumferential insert on which at least one filling insert is applied, in a radially outer position thereof. Such annular anchoring structures are commonly identified as "bead cores" and have the task of keeping the tyre well fixed to the anchoring seat specifically provided in the wheel rim, thus preventing, in operation, the radially inner end edge of the tyre coming out from such seat.

At the beads specific reinforcing structures may be provided having the function of improving the torque transmission to the tyre.

In a radially outer position with respect to the carcass ply, a belt structure comprising one or more belt layers is associated, said belt layers being arranged one on top of the other and having textile or metal reinforcing cords with crossed orientation and/or substantially parallel to the direction of circumferential extension of the tyre.

Between the carcass structure and the belt structure a layer of elastomeric material, known as "under-belt," can be provided, said layer having the function of making the radially outer surface of the carcass structure as uniform as possible for the subsequent application of the belt structure.

In a radially outer position with respect to the belt structure a tread band is applied, made from elastomeric material as well.

Between the tread band and the belt structure a so-called "under-layer" of elastomeric material can be arranged, said layer having properties suitable to ensure a steady union of the tread band itself.

On the side surfaces of the carcass structure respective sidewalls of elastomeric material are also applied, each one extending from one of the side edges of the tread band up to the respective annular anchoring structure to the beads.

With particular reference to the zone of the tyre identified as "bead," this is defined by a free end portion of the carcass ply specifically turned up and housing the annular anchoring structure or bead core and the filling insert therein. The coupling of the bead core to the carcass ply comprises in particular for a step prior to the step of turning up the free end portion of the carcass ply, wherein the filling insert of the bead core is brought into contact with the end edge of the carcass ply and a step simultaneous to the step of turning up the free end portion of the carcass ply, wherein the filling insert of the bead core is laid down or pulled down on the end edge of the carcass ply.

U.S. Pat. No. 4,508,586 describes a process wherein turning up of the free end portion of the carcass ply and simultaneous pulling down of the filling insert of the bead core on the end edge of the carcass ply is carried out using an air tube specifically provided in an axially outer position with respect to the forming support on which the carcass ply is arranged. Such air tube, once inflated, raises the free end portion of the carcass ply so that this can be then turned up by the effect of the thrust action exerted on the inflated air tube by a special thrust member.

US 2005/0150587 A1 describes a process similar to the one discussed above, wherein a specifically designed and shaped air tube is used for turning up the free end portion of the carcass ply and simultaneously pulling down of the filling insert of the bead core on the end edge of the carcass ply, without the need of using any thrust member.

US 2006/0102272 A1 describes a process of the type discussed hereinabove, wherein in order to carry out the turning up of the free end portion of the carcass ply and the simultaneous pulling down of the filling insert of the bead core on the end edge of the carcass ply, a mechanical arm provided with pressing rolls at a free end thereof is used in place of an air tube.

SUMMARY

The Applicant has noted that in the processes described above wherein the pulling down of the filling insert on the end edge of the carcass ply is carried out simultaneously to the turning up of the free end portion of the carcass ply, the keeping into position of the bead core on the end edge of the carcass ply during the turning up of the free end portion of the carcass ply is only due to the stickiness of the rubber mixture with the rubber mixture of the fabric by which the carcass ply is made. Such stickiness is not always sufficient to ensure keeping the desired concentricity between bead core and forming support of the carcass structure when, during the pulling down of the filling insert, the bead core is subjected to non-negligible stresses.

The Applicant has further noted that the above stresses are especially high when assembling high performance tyres of the lowered type, wherein particularly low and/or stocky filling inserts are used. This is due to the high structural stiffness of such filling inserts, that is, to the high resistance that such inserts offer to the deformation thereof. In such circumstances, the traditional processes described above do not always ensure a suitable pulling down of the filling inserts. In particular, the filling insert may not adhere to the carcass ply evenly, thus creating undesired air channels between filling insert and carcass ply that reduce the tyre performance in use.

The Applicant has now found that it is possible to ensure keeping the desired concentricity between bead core and forming support in the turning up of the free end portion of the carcass ply, in addition to a suitable pulling down of the filling inserts also in the case of particularly low and/or stocky filling inserts, by carrying out the step of pulling down the filling insert while a special bead core positioning member retains the bead core in contact position with the end edge of the carcass ply, before carrying out the turning up of the free end portion of the carcass ply.

Therefore, in a first aspect thereof, the present invention relates to a process for manufacturing a tyre for vehicle wheels, comprising the step of building on a forming support a carcass structure comprising at least one carcass ply and, at at least one end edge of said at least one carcass ply, at least one annular anchoring structure comprising at least one substantially circumferential annular insert and at least one filling insert associated to said at least one substantially circumferential annular insert, wherein the step of assembling said carcass structure comprises the steps of:

positioning said at least one annular anchoring structure on said at least one carcass ply moving said at least one substantially circumferential annular insert in contact with said at least one end edge of said at least one carcass ply;

pulling down said at least one filling insert on said at least one end edge of said at least one carcass ply;

turning up a free end portion of said at least one end edge of said at least one carcass ply so as to form a turned up end portion of said at least one carcass ply including said at least one annular anchoring structure; wherein the step of pulling down said at least one filling insert on said at least one end edge of said at least one carcass ply is carried out while said at least one substantially circumferential annular insert is retained into a contact position with said at least one end edge of said at least one carcass ply by at least one positioning member.

Advantageously, the process of the present invention allows manufacturing high efficiency tyres, even of the high performance lowered type, wherein the bead core position is that desired and defined in the design stage, such position not being altered by the effect of the stresses the bead core is subjected to during the steps of pulling down the filling insert and turning up the free end portion of the carcass ply. In fact, in accordance with the present invention, the substantial irremovability of the bead core during the pulling down of the filling insert is ensured by the fact that such pulling down takes place while the bead core is held into a contact position with the end edge of the carcass ply by special bead core positioning members. The substantial irremovability of the bead core during the turning up of the free end portion of the carcass ply, on the other hand, is ensured by the fact that the bead core adheres to the carcass ply thanks to the stickiness with the rubber mixture of the fabric by which the carcass ply is made, both of the rubber mixture of the bead core and of the rubber mixture of the filling insert. According to the present invention it is therefore possible to ensure the desired concentricity between bead core and forming support during the pulling down of the filling insert and the turning up of the free end portion of the carcass ply, even in the case where particularly low and/or stocky filling inserts are used, such as those used in the assembly of high performance tyres of the lowered type.

In a second aspect thereof, the present invention relates to an apparatus for building a carcass structure of a tyre for vehicle wheels on a forming support, said carcass structure comprising at least one carcass ply and, at at least one end edge of said at least one carcass ply, at least one annular anchoring structure comprising at least one substantially circumferential annular insert and at least one filling insert associated to said at least one substantially circumferential annular insert, said apparatus comprising:

at least one positioning member of said at least one annular anchoring structure on said at least one end edge of said at least one carcass ply;

at least one pulling down member of said at least one filling insert on said at least one end edge of said at least one carcass ply;

at least one forming member of a turned up end portion of said at least one carcass ply;

wherein said at least one pulling down member is adapted to act onto said at least one filling insert while said at least one positioning member retains said at least one substantially circumferential annular insert into a contact position with said at least one end edge of said at least one carcass ply.

Advantageously, such apparatus allows carrying out the process of the present invention and thus, achieving the advantages mentioned above.

Throughout the present description and in the following claims, the terms "radial" and "axial" and the expressions "radially inner/outer" and "axially inner/outer" are used with reference to the radial direction and to the axial direction of the forming support.

The present invention, in at least one of the aforementioned aspects thereof, can have at least one of the following preferred features.

In the preferred embodiments of the present invention, the pulling down of the filling insert is carried out by pushing the filling insert against the forming support while the substantially circumferential annular insert is retained by thrust against said forming support by said at least one positioning member. Advantageously, in this way the undesired movement of the annular anchoring structure with respect to the forming support during the pulling down of the filling insert and the subsequent turning up of the free end portion of the carcass ply is prevented.

According to a first embodiment of the present invention, the pulling down of the filling insert is carried out by exerting a predetermined thrust on at least a portion of a side surface of said at least one filling insert by at least one thrust member.

Preferably, the side surface portion of the filling insert whereon the thrust is initially exerted is a radially outer portion and the step of pushing the filling insert comprises the step of axially moving the above thrust member for exerting said thrust on a progressively larger portion of the side surface of the filling insert starting from said radially outer portion along the whole radial extension of said side surface.

Advantageously, an effective adhesion of the filling insert on the carcass ply is thus obtained, with clear advantages in terms of tyre quality and performance.

In a particularly preferred embodiment of the present invention, said thrust member has a predetermined profile.

Preferably, such predetermined profile is a profile conjugated to that of the side surface of the filling insert when the filling insert is pulled down on the end edge of the carcass ply. Advantageously, such an arrangement allows obtaining, in a very short time, a substantially even pulling down of the filling insert on the carcass ply.

According to a second embodiment of the present invention, the side surface portion of the filling insert on which the thrust is initially exerted is a radially inner portion and the step of pushing the filling insert comprises the step of axially moving said thrust member for exerting said thrust on a different portion of the side surface of the filling insert starting from said radially inner portion to continue on a radially outer portion of the side surface with respect to said radially inner portion.

Advantageously, such solution is especially advantageous since it allows carrying out the same process and using the same apparatus as the size of the filling insert and the fitting change.

Preferably, said thrust is exerted by a plurality of pressing members arranged adjacent to one another along a circumferential direction and having a predetermined profile.

In preferred embodiments of the present invention, said pressing members comprise rollers having a concave profile. Preferably, such concave profile has as bending radius greater than 3 mm compared to the radius of the forming support, and more preferably smaller than 5 mm compared to the radius of the forming support.

In specific embodiments of the present invention, the filling insert has a height not greater than 30 mm, preferably not greater than 25 mm.

In further specific embodiments of the present invention, the filling insert has a height not lower than 7 mm.

Preferably, the filling insert has a height comprised between 7 and 30 mm, more preferably between 7 and 25 mm.

Preferably, the filling insert has a substantially triangular shape, with a base having a length shorter than 12 mm.

In the preferred embodiments of the apparatus of the present invention, the pulling down member of the filling insert is mechanically associated to the positioning member of the annular anchoring structure and is mechanically separate from the forming member of the turned up end portion of the carcass ply. In this way it is possible to carry out the pulling down while the positioning member is operating in retaining the annular anchoring structure into position on the end edge of the carcass ply and before actuating the forming member.

Preferably, the pulling down member of the filling insert is slidingly associated to the positioning member of the annular anchoring structure. Advantageously, the pulling down of the filling insert therefore is carried out by the effect of the stroke of the pulling down member with respect to the positioning member of the annular anchoring structure while the latter is operating in retaining the annular anchoring structure into position on the end edge of the carcass ply.

Preferably, the stroke of the pulling down member of the filling insert is controlled by a hydraulic cylinder, or by any other conventional device that in any case ensures a thrust on the pulling down member sufficient for the deformation of the filling insert.

Preferably, the pulling down member of the filling insert is removably associated to the positioning member of the annular anchoring structure, so as to be removed for any maintenance and/or replacement operations. Such device further allows providing a plurality of pulling down members different from one another by dimensions and profile of the surface intended to come into contact with the filling insert, so as to fit the most suitable pulling down member on the apparatus according to the dimensions and the profile of the filling insert to be pulled down.

As already mentioned, in a first preferred embodiment of the present invention, the pulling down member of the filling insert comprises a thrust member of the filling insert against the forming support.

In a first preferred embodiment of the present invention, said thrust member has a predetermined profile, preferably a profile conjugated to that of the side surface of the filling insert when the filling insert is pulled down on the end edge of the carcass ply.

In a second preferred embodiment of the present invention, the pulling down member of the filling insert comprises at least one pressing member mechanically associated to the thrust member of the filling insert.

Preferably, said pressing member comprises a respective arm pivoted to the thrust member at a pivoting axis substantially perpendicular to a radial plane of the forming support and a respective roller rotatably associated to said arm, the arm further being elastically associated to the thrust member for keeping the contact with the filling insert during the pulling down of the filling insert.

More preferably, the pressing member comprises a traction spring operatively arranged between said arm and said thrust member. Of course, it is possible to provide elastic means other than the traction spring to carry out the same function.

BRIEF DESCRIPTION OF THE DRAWINGS

Further features and advantages of the present invention will appear more clearly from the following detailed description of some preferred embodiments of an apparatus and process according to the present invention, made with reference to the annexed drawings. In such drawings:

FIG. 5 is a schematic view of the apparatus of FIG. 3 in a third operating configuration thereof;

FIG. 6 is a schematic side view of a portion of the apparatus of FIG. 3;

FIG. 7 is a schematic view showing a step of the process of the present invention following that illustrated in FIGS. 2 and 5.

DETAILED DESCRIPTION

Figure 1:
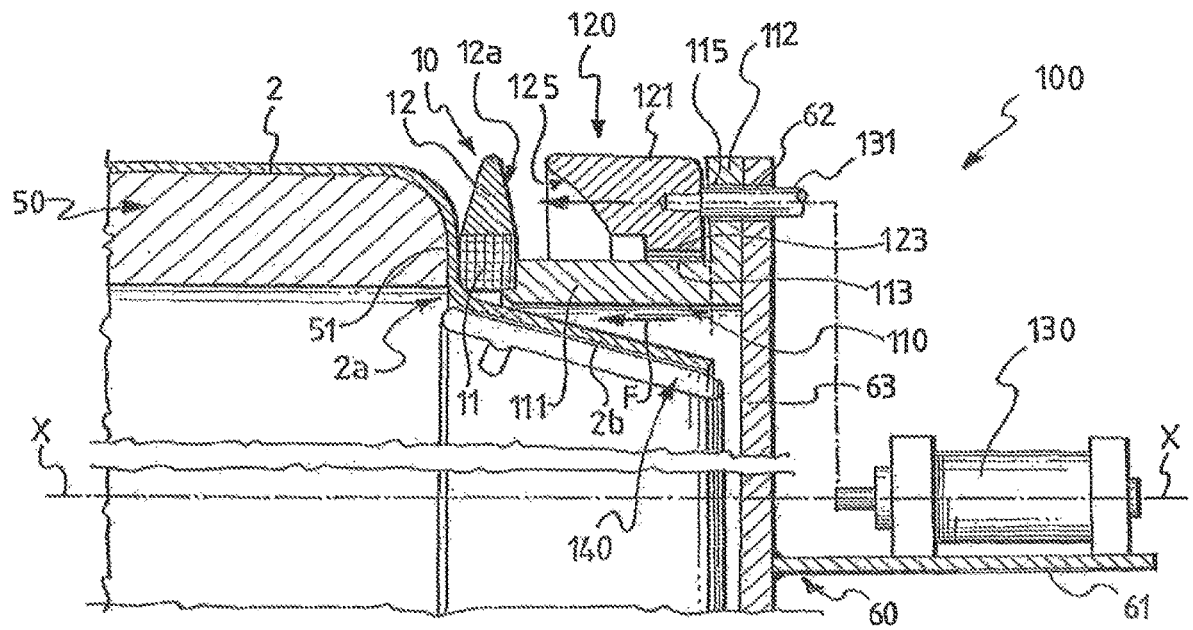
FIG. 1 is a schematic partly cutaway view of a longitudinal section of a portion of a first embodiment of an apparatus that carries out a process according to the present invention, such apparatus being in a first operating configuration thereof.
Figure 2:
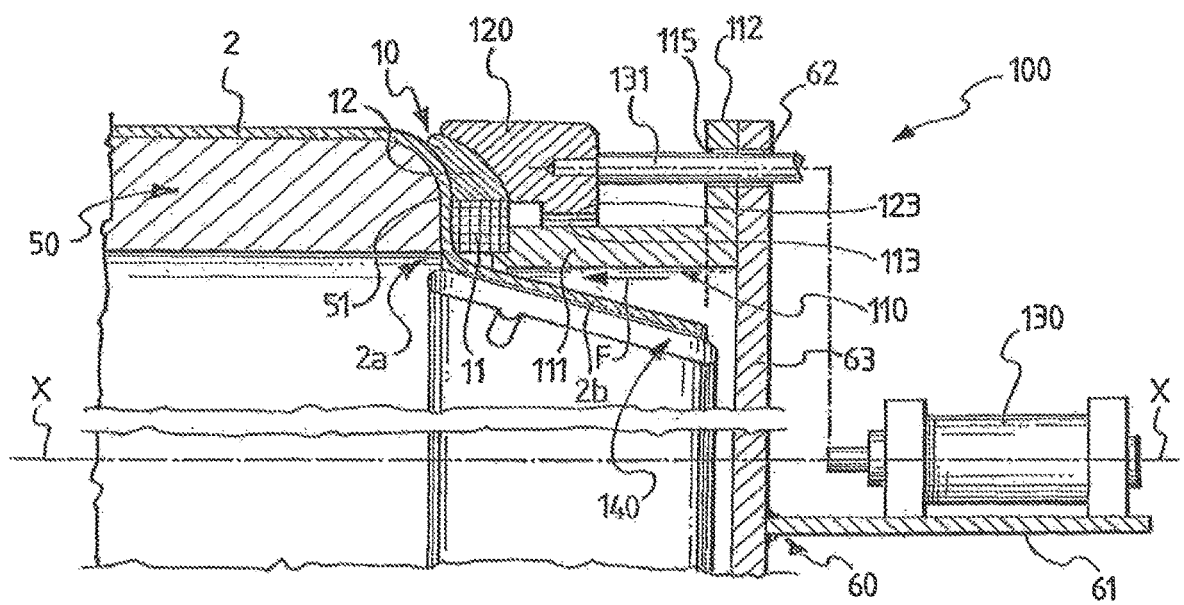
FIG. 2 is a schematic view of the apparatus of FIG. 1 in a second operating configuration thereof.

In FIGS. 1 and 2, reference numeral 100 globally indicates a first illustrative embodiment of an apparatus usable in a process for manufacturing a tyre for vehicle wheels, according to a first embodiment of the present invention. In particular, apparatus 100 is used in a step of building a carcass structure of the tyre for arranging one or more annular anchoring structures 10 (hereinafter also called bead cores) at that region of the carcass structure that will constitute the bead of the tyre. Such annular anchoring structures 10 are intended to keep the tyre well fixed to the anchoring seat specifically provided in the rim of the vehicle wheel.

The building of the carcass structure of the tyre comprises the preliminary step of arranging a carcass ply 2 on a substantially cylindrical forming support 50 and after that, the step of associating each annular anchoring structure 10 to an end edge 2a of the carcass ply 2.

In the embodiment illustrated in FIGS. 1-2, the annular anchoring structure 10 is associated to the end edge 2a of the carcass ply 2 at a side shoulder 51 of the forming support 50, such forming support 50 being rotatably mounted about an axis of rotation X-X in a totally conventional manner.

The structure of the forming support 50 is not described in detail herein as it can be made in any convenient manner by a man skilled in the art.

As illustrated in FIGS. 1 and 2, each annular reinforcing structure 10 comprises at least one substantially circumferential annular insert 11 on which at least one filling insert 12 is applied in a radially outer position thereof.

Always with reference to FIGS. 1 and 2, apparatus 100 comprises a member 110 sliding parallel to the axis of rotation X-X of the forming support 50, and thus in the two opposite ways of the direction indicated in FIGS. 1 and 2 by arrow F, so as to move close to, or away from, the forming support 50. The movement of ring 110 towards, and away from, the forming support 50 is carried out in a totally conventional manner by means known by a man skilled in the art.

Ring 110 is intended to bring the annular anchoring structure 10 in contact with the end edge 2a of the carcass ply 2. In particular, as illustrated in FIGS. 1 and 2, ring 110 acts on the substantially circumferential annular insert 11 of the annular anchoring structure 10 pushing it against shoulder 51 of the forming support 50, thus positioning the annular anchoring structure 10 in the desired position on the end edge 2a of the carcass ply 2. Throughout the present description, ring 110 shall also be defined as "bead core holder ring".

The bead core holder ring 110 comprises a tubular portion 111 extending parallel to the axis of rotation X-X of the forming support 50 and an annular portion 112 extending perpendicular to the aforementioned axis of rotation X-X. Sliding guides 113 extending parallel to the axis of rotation X-X of the forming support 50 are provided on the radially outer annular surface of the tubular portion 111 of the bead core holder ring 110.

According to the present invention, apparatus 100 of FIGS. 1 and 2 comprises a member 120 slidingly mounted, by special guides 123, on the sliding guides 113 of the bead core holder ring 110.

In the specific embodiment illustrated in FIGS. 1 and 2, member 120 is made in the shape of a ring 121, but it is possible to envisage different embodiments, such as for example a plurality of members arranged side by side in circumferential direction so as to substantially define a ring.

Ring 121 is intended to slide with respect to the bead core holder ring 110 in the direction indicated in FIG. 1 by arrow G for pushing the filling insert 12 of the annular anchoring structure 10 against shoulder 51 of the forming support 50, thus obtaining the pulling down of the filling insert 12 on the end edge 2a of the carcass ply 2, substantially as illustrated in FIG. 2. Throughout the present description, ring 121 shall be defined as "filling insert pulling down ring."

In the specific embodiment illustrated in FIGS. 1 and 2, the movement of the filling insert pulling down ring 121 is controlled by a piston 131 of a hydraulic cylinder 130 suitably arranged in the proximity of the forming support 50, for example on a support bracket 61 of a support frame 60. Piston 131 is rigidly associated to the filling insert pulling down ring 121 and crosses a hole—62 formed on a side wall 63 of the support frame 60 and a hole 115 formed on the annular portion 112 of the bead core holder ring 110 and axially aligned to hole 62.

Of course, in place of the hydraulic cylinder 130 any other conventional device may be used which in any case guarantees a thrust sufficient for deforming the filling insert 12 of the annular anchoring structure 10.

As illustrated in FIG. 2, the filling insert pulling down ring 121 acts on the filling insert 12 of the annular anchoring structure 10 while the bead core holder ring 110 pushes the substantially circumferential annular insert 11 of the annular anchoring structure 10 against the shoulder 51 of the forming support 50.

Preferably, the filling insert pulling down ring 121 is removably associated to the bead core holder ring 110 so as to be removed for any maintenance and/or replacement operations.

The filling insert pulling down ring 121 preferably has a side surface 125 having a predetermined profile. More preferably, the profile of the side surface 125 is conjugated to that of the corresponding side surface 12a of the filling insert 12 when such insert is pulled down on the end edge 2a of the carcass ply 2, so as to act on the entire annular and radial extension of the side surface 12a during the pulling down of the filling insert 12.

With reference to FIGS. 1 and 2, a preferred embodiment of the process that can be carried out by apparatus 100 described above shall now be described.

In a first process step, illustrated in FIG. 1, the annular anchoring structure 10 is pushed by the bead core holder ring 110 against the shoulder 51 of the forming support 50. In particular, the bead core holder ring 110 acts by thrust on the substantially circumferential annular insert 11 up to bring it in contact with the end edge 2a of the carcass ply 2 previously positioned on the forming support 50. The radial position of the substantially circumferential annular insert 12 on the end edge 2a of the carcass ply is predetermined in the design stage.

In this step, the end portion 2b of the end edge 2a is kept shifted towards the axis of rotation X-X of the forming support 50 by special members (not shown), so as to allow the bead core holder ring 110 to come close to the forming support 50. Moreover, in this step, the filling insert pulling down ring 121 is kept into a position axially spaced from the filling insert 12.

In a subsequent step, illustrated in FIG. 2, while the bead core holder ring 110 continues to act by thrust on the substantially circumferential annular insert 11 for retaining it into position against shoulder 51 of the forming support 50, the filling insert pulling down ring 120 is axially pushed by the hydraulic cylinder 130, by means of the piston 131 thereof, against shoulder 51 of the forming support 50. In this step, the pulling down of the filling insert 12 on the end edge 2a of the carcass ply 2 is carried out.

In particular, such pulling down takes place by first exerting a predetermined thrust on a radially outer portion of the side surface 12a of the filling insert 12 and then, by axially moving the thrust ring 121 towards the forming support 50, exerting such thrust on a progressively larger portion of the side surface 12a of the filling insert 12 starting from the aforementioned radially outer portion along all the radial extension of the side surface 12a.

The aforementioned step allows the steady anchoring of the annular anchoring structure 10 on the end edge 2a of the carcass ply 2. Such steady anchoring is ensured by the stickiness with the rubber mixture of the carcass ply 2 both of the rubber mixture of the substantially circumferential annular insert 11 of the annular anchoring structure 10 and of the rubber mixture of the pull down filling insert 12.

Figure 3:
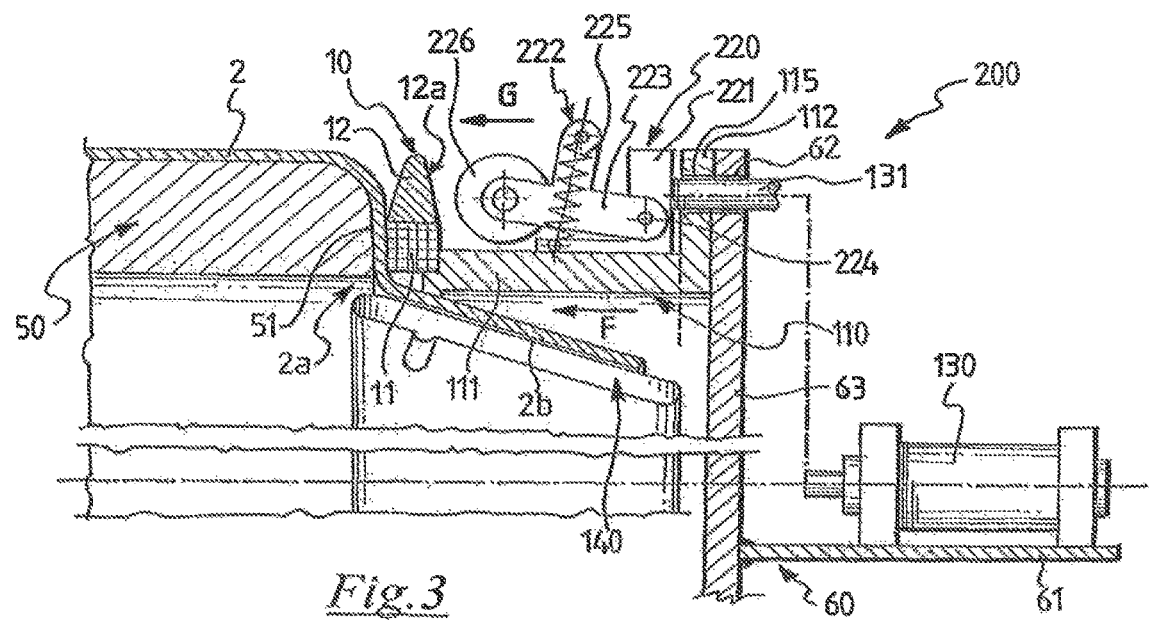
FIG. 3 is a schematic partly cutaway view of a longitudinal section of a portion of a second embodiment of an apparatus that carries out a process according to the present invention, such apparatus being in a first operating configuration thereof.
Figure 4:
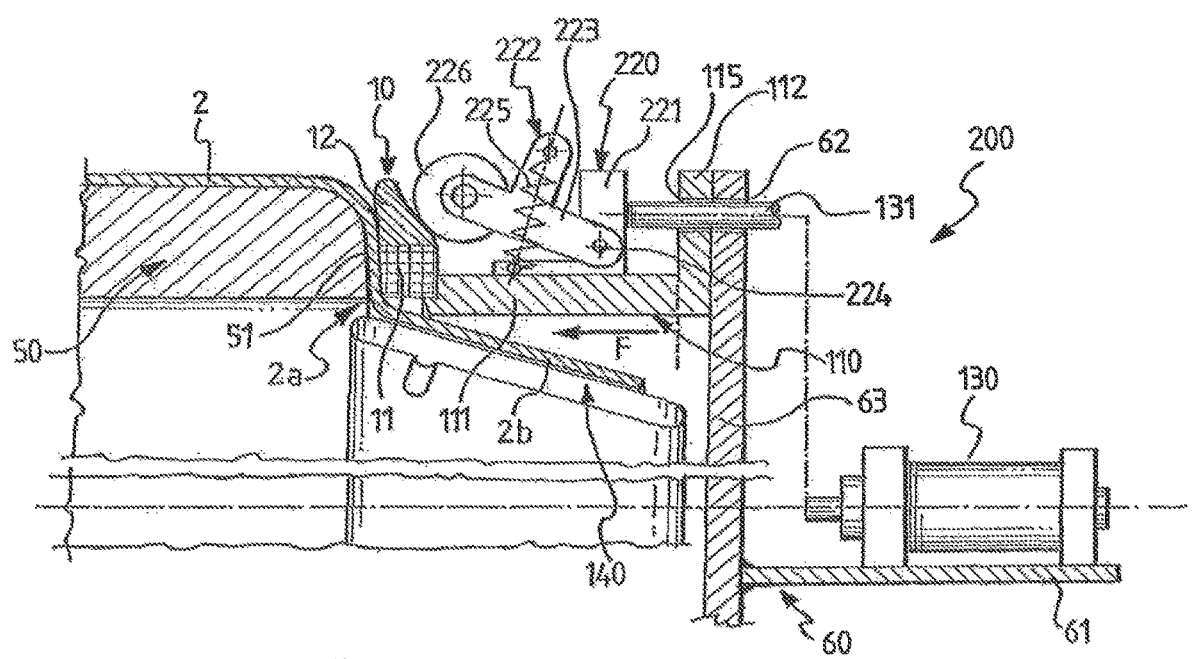
FIG. 4 is a schematic view of the apparatus of FIG. 3 in a second operating configuration thereof.

FIGS. 3 to 5 show in a sequence the operating steps of an alternative embodiment of the apparatus of the present invention, globally indicated with reference numeral 200. In such embodiment, elements identical to those described before with reference to apparatus 100 of FIGS. 1 and 2 are indicated with the same reference numeral.

Apparatus 200 of FIG. 3-5 differs from apparatus 100 of FIG. 1-2 only in that the pulling down of the filling insert 12 on the end edge 2a of the carcass ply 2 takes place by a member 220 of a different type from the filling insert pulling down ring 120 used in apparatus 100 of FIGS. 1 and 2. Apart from this, apparatus 200 is totally identical to apparatus 100 of FIGS. 1 and 2.

In particular, in apparatus 200 of FIG. 3 the filling insert pulling down member 220 comprises a thrust ring 221 slidingly associated to the bead core holder ring 110 in a manner totally similar to the filling insert pulling down ring 121 of apparatus 100 of FIGS. 1 and 2, and a plurality of pressing members 222 (only one of which being illustrated in FIGS. 3-5) arranged side by side in a circumferential direction (FIG. 6) and each elastically associated to the thrust ring 221.

In particular, each pressing member 222 comprises a respective arm 223 pivoted on the thrust ring 221 at a special pin 224 having a pivoting axis substantially perpendicular to a radial plane of the forming support 50.

Arm 223 is further elastically associated to the thrust ring 221 by a traction spring 225 active along a predetermined direction defined in the above radial plane for keeping arm 223 pressed against portion 111 of the bead core holder ring 110. In substance, arm 223, when stressed in a direction opposite that wherein the elastic return stress exerted by spring 225 acts, is movable in clockwise direction around pin 224 in the radial plane of the forming support 50.

Each pressing member 222 further comprises a roller 226 rotatably associated to the respective arm 223. Roller 226 preferably has a concave profile, with a bending radius greater than 3 mm, and more preferably smaller than 5 mm, compared to the radius of the forming support 50.

Preferably, the coupling between rollers 226 and arms 223 and that between arms 223 and thrust ring 221 is of removable type.

The process carried out by apparatus 200 of FIG. 3-5 is totally similar to that carried out by apparatus 100 of FIG. 1-2 described above, with the only difference that, as shown in the sequence of FIGS. 3 to 5, the pulling down of the filling insert 12 on the end edge 2a of the carcass ply 2 in this case takes place by the effect of the rolling of rollers 226 on the side surface 12a of the filling insert 12 starting from a radially inner portion of such side surface 12a to continue on a radially outer portion of the side surface 12a with respect to the aforementioned radially inner portion. Such rolling takes place by the effect of the axial movement of the thrust ring 221 which, actuated by the hydraulic cylinder 130 by means of piston 131, is pushed against shoulder 51 of the forming support 50. During their rolling, rollers 226 are kept pressed on the filling insert 12 by the elastic return action exerted by spring 225.

Also in this case, as shown in particular in FIGS. 4 and 5, rollers 226 act on the filling insert 12 of the annular anchoring structure 10 while the bead core holder ring 110 pushes the substantially circumferential annular insert 11 of the annular anchoring structure 10 against shoulder 51 of the forming support 50.

In the building step of the carcass structure of the tyre, the aforementioned steps of positioning the annular anchoring structure 10 on the end edge 2a of the carcass ply 2 and of pulling down the filling insert 12 are repeated several times if more than one annular anchoring structure 10 must be associated to the end edge 2a of the carcass ply 2.

Moreover, further operating steps may be provided besides those described above, wherein specific reinforcing structures (not shown) are associated to the carcass ply 2 in radially and/or axially outer and/or inner position with respect to each annular anchoring structure 10.

Both in the case in which apparatus 100 of FIG. 1-2 or apparatus 200 of FIG. 3-5 is used, subsequent to the step of pulling down the filling insert 12 and optionally to the step of laying the above, reinforcing structures, an operating step is provided wherein the end edge 2a of the carcass ply 2 is turned up on itself so as to form a turned up end portion 20 of the carcass ply 2 comprising the annular anchoring structure 10 and optionally the above reinforcing structures (FIG. 7) therein.

Such step can be carried out in a conventional manner, for example by the use of an air tube 140 of the conventional type and of a shaped ring 150, also of the conventional type, movable in a direction E parallel to the axis of rotation X-X of the forming support 50 (FIG. 7). In particular, the air tube 140, once inflated, lifts a free end portion 2b of the end edge 2a of the carcass ply 2. At that point, the shaped ring 150 pushes such air tube 140 towards shoulder 51 of the forming support 50 thus forming the turned up end portion 20 of the carcass ply 2 and thus, the tyre bead.

According to the present invention, therefore, the member 140 that carries out the turning up of the end portion of the carcass ply 2 is operatively separate from member 120, 220 that carries out the pulling down of the filling insert 12 of the annular anchoring structure 10.

A step of passing a pressing member (not shown) on the turned up end 20 of the carcass ply 2 is also preferably provided in order to compact the tyre bead.

The use of apparatus 100 and 200 of the present invention is particularly advantageous when the filling insert to be pulled down is particularly low and stocky, with a height not greater than 30 mm, more preferably not greater than 25 mm, and even more preferably not smaller than 7 mm.

Preferably, moreover, the filling insert has a substantially triangular shape, with a base having a length shorter than 12 mm.

Of course, what said above also applies when filling inserts having different height and shape than those mentioned above are used.

From the above description it is clear that the various embodiments of the process and of the apparatus described above allow manufacturing high efficiency tyres, even of the high performance lowered type, wherein the bead core position is the one desired and defined in the design stage, such position not being altered by the effect of the stresses the bead core is subjected to during the steps of pulling down the filling insert and turning up the free end portion of the carcass ply. This occurs thanks to the fact that the step of pulling down the filling insert is carried out before the turning up step and in particular, while the bead core is retained into a contact position with the end edge of the carcass ply by a special bead core positioning member.

The invention claimed is:

1. An apparatus for building a carcass structure of a tyre for a vehicle wheel on a forming support, the carcass structure comprising a carcass ply, and, at an end edge of the carcass ply, an annular anchoring structure comprising a substantially circumferential annular insert and a filling insert associated with the substantially circumferential annular insert, comprising:
- a positioning member of the annular anchoring structure on the end edge of the carcass ply, wherein the positioning member is configured to bring the annular anchoring structure in contact with the end edge of the carcass ply;
- a ring having a side surface with a predetermined profile, wherein the predetermined profile of the side surface of the ring is conjugated to a profile of a side surface of the filling insert when pulled down on the end edge of the carcass ply to act on the entire side surface of the filling insert annularly and radially; and
- a turning-up member of a turned up end portion of the carcass ply;
- wherein the ring is configured to slide with respect to the positioning member and is adapted to act on the filling insert while the positioning member retains the substantially circumferential insert in a contact position with the end edge of the carcass ply and before the turning-up member formed the turned up end portion of the carcass ply; and
- wherein the ring is controlled by a hydraulic cylinder with a piston, the piston passes through the positioning member to contact the ring, and
- wherein the side surface of the ring only moves along a direction parallel to a longitudinal axis of the piston.

2. The apparatus according to claim 1, wherein the ring axially pushes the filling insert onto the edge of the carcass ply by the piston of the hydraulic cylinder.

3. The apparatus according to claim 1, wherein the turning-up member comprises an air tube to lift a free end portion of the end edge.

4. The apparatus according to claim 1, wherein the ring is removably associated with the positioning member.

5. The apparatus according to claim 1, wherein the filling insert has a height not greater than 30 mm.

6. The apparatus according to claim 1, wherein the filling insert has a height not lower than 7 mm.

7. The apparatus according to claim 1, wherein the filling insert has a substantially triangular shape, with a base having a length shorter than 12 mm.

8. The apparatus of claim 1, wherein the ring exerts a thrust action initially on a radially outer annular portion of the side surface of the filling insert and then on progressively larger portions of the side surface of the filling insert starting from the radially outer portion along the whole radial extension of the side surface of the filling insert.

9. The apparatus of claim 1, wherein the positioning member comprises a tubular portion extending parallel to an axis of rotation of the forming support and having, on a radially outer annular surface thereof, sliding guides extending parallel to the axis of rotation, and wherein the ring is slidingly mounted on the sliding guide and slides with respect to the tubular portion of the positioning member.

10. The apparatus of claim 1, wherein the ring is slidingly mounted onto the positioning member by at least one guide.

11. The apparatus of claim 1, wherein an end of the piston is embedded within the ring.

12. An apparatus for building a carcass structure of a tyre for a vehicle wheel on a forming support, the carcass structure comprising a carcass ply, and, at an edge of the carcass ply, an annular anchoring structure comprising a substantially circumferential annular insert and a filling insert associated with the substantially circumferential annular insert, comprising:
- a positioning member of the annular anchoring structure on the end edge of the carcass ply, wherein the positioning member is configured to exert a pushing action on a side surface of the annular anchoring structure in order to bring the annular anchoring structure in contact with the end edge of the carcass ply and to press the annular anchoring structure against a shoulder of the forming support opposite to the side surface of the annular anchoring structure;
- a ring having a side surface with a predetermined profile, wherein the predetermined profile of the side surface of the ring is conjugated to a profile of a side surface of the filling insert when pulled down on the end edge of the carcass ply to act on the entire side surface of the filling insert annularly and radially; and
- a turning-up member of a turned up end portion of the carcass ply;
- wherein the ring is configured to slide with respect to the positioning member and to act on the filling insert while the positioning member retains the substantially circumferential annular insert in a contact position with the end edge of the carcass ply by continuing to exert the pushing action and before the turning-up member forms the turned up end portion of the carcass ply,
- wherein the side surface of the ring moves only along a direction parallel to an axis of rotation of the forming support.

* * * * *